(12) United States Patent
Jung

(10) Patent No.: US 6,657,560 B1
(45) Date of Patent: Dec. 2, 2003

(54) ROUNDED KEYPAD

(76) Inventor: Richard Jung, 331A 1st St., Palisades Park, NJ (US) 07650

( * ) Notice: Subject to any disclaimer, the term of this patent is extended or adjusted under 35 U.S.C. 154(b) by 103 days.

(21) Appl. No.: 09/682,796

(22) Filed: Oct. 19, 2001

(51) Int. Cl.[7] ................. H03K 17/94; H03M 11/00
(52) U.S. Cl. ........................... 341/22; 400/486
(58) Field of Search ............ 341/20, 22; 400/486; 345/168; 379/368; 361/679

(56) References Cited

U.S. PATENT DOCUMENTS 5,483,235 A * 1/1996 Hanson et al. ............ 341/20

* cited by examiner

Primary Examiner—Timothy Edwards
(74) Attorney, Agent, or Firm—Richard M. Goldberg

(57) ABSTRACT

A rounded keypad device capable of being operated with only one finger comprises the invention. The keypad device includes a keypad having keys, which are positioned within a movement radius of the finger of an operator and have the English letters required for forming desired words or numbers or functions to be executed. The keys are arranged in a high using-frequency key section involving first set keys among the keys of the keypad, the first keys being assigned to English letters and functions that are relatively frequently used when inputting letters and function executing instructions. The first keys being positioned in a round configuration which is defined around the eye's focal point on the keypad and in a minimum movement radius of the finger of the operator, along a first virtual circle. The keypad also includes a second low-using frequency key section comprising remaining second set of keys among the keys of the keypad, the second keys being assigned to English letters and functions that are relatively infrequently used when inputting letters and function executing instructions. The second set of keys is arranged in a rounded configuration concentric with the rounded configuration of the first set of keys and having a radius larger than the minimum movement radius. Various mode and function switches are also provided and the geometric configurations can be used with a variety of keypads and for inputting a variety of devices.

34 Claims, 15 Drawing Sheets

Mode 1

Mode 2

Mode 3

Function 1

Function 2

Function 3

ROUNDED KEYPAD

BACKGROUND OF INVENTION

This invention relates to a device for inputting information into systems and particularly to a rounded keypad for inputting directions, numbers, letters, etc. into equipment such as computers, telephones, etc., using only one or both thumbs. The concentric array of keys arranged in a clockwise order provides the easiest, fastest way of inputting data. The geometric arrangement of the keys is an important feature of the invention.

Known data input means and function execution means usually comprise a conventional keyboard used with computers and the like or the limited arrangements appearing on calculators, portable radio telephones, electronic memo books, and the like. The present invention while utilizing available technology provides a unique push button rounded keypad, which is smaller and easier to operate than the prior art. The rounded keypad permits rapid input of data into computers, etc., and particularly hand held portable devices using one or both thumbs.

A keyboard of a computer system has a conventional key arrangement shown in FIG. 1 and is configured in a manner such that a user can quickly input desired letters, numerals, and so forth and can quickly execute required functions. However, the keyboard of a computer system is not able to properly serve as portable information input means where it is carried by the user. That is to say, since the computer keyboard has a relatively large size, it cannot readily be applied to a rounded portable device such as a portable radiotelephone, a Personal Digital Assistant (PDA) and the like. As a consequence, notwithstanding convenience of data entry, it is not possible to adopt the keyboard of a computer system in it present format as information input means for a rounded portable device.

To solve these problems, various rounded keypad devices have been proposed in the art as information input means which can be properly used in a portable radiotelephone and other rounded keypad devices. A typical example of a rounded keypad device is the keypad device of a portable radiotelephone, which has the key arrangement shown in FIG. 2.

However, while the conventional keypad device of a portable radiotelephone has certain advantages, since it can be mounted in a narrow space and a user can input desired information while carrying it, the device suffers from defects in terms of efficiency in that inputting information is slow. In other words, although the conventional keypad device can be used to some degree as a rounded portable device because of size, it cannot provide sufficient inputting of information similar to the keyboard of the computer system.

Keypads having a diversity of shapes, which can serve as miniaturized information input devices, have been described in the prior art. However, since most of these keypads are manufactured with emphasis on miniaturization, they are not satisfactory from the standpoint of an operator's convenience in inputting information.

The prior art includes U.S. Pat. No. 5,999,827 to Sudo, et al which discloses a communication terminal apparatus having a main body, a selection operation unit, an operation-inputting unit, a display unit, and a controller. The operation-inputting unit is provided on the main body and changes functions based on the mode selected by the selection operation unit. A conventional calculator type keyboard is used.

U.S. Des. Pat. No. 393,262 to Shimatsu, et al discloses a portable information storing and retrieving device wherein the controls are in a circular array about a center key.

U.S. Des. Pat. No. 413,896 to Frye, et al discloses a key array for a handset wherein the keys are of different shaped configurations.

U.S. Des. Pat. No. 4,211,497 to Montgomery discloses a data input system wherein the keys of each keyboard are arranged such that the most often used keys are situated in the most readily accessible locations with respect to the fingers of the operator.

U.S. Des. Pat. No. 4,849,732 to Dolenc discloses a one hand key shell for operation by a single human hand with specific keys operable by specific fingers. The control keys may be used to manipulate test or other information entered into the attached device and operated by the thumb. The keyboard is divided into sections with five sets of keys.

U.S. Pat. No. 5,059,048 to Sirkin discloses a keyboard for use with one hand having curvilinear and linear rows of keys. The keyboard contains at least four vertical columns of keys, at least six horizontal rows of keys, at least 26 data entry keys, at least 11 multiple entry keys and at least 3 command keys.

U.S. Pat. No. 5,479,163 to Samuelwicz discloses a circular tactile keypad for a controller of an electrical device. The keys are arranged in a clock face pattern with key findings ridges emanating from the circular center.

U.S. Pat. No. 5,332,322 to Gambaro discloses a handheld thumb actuated ergonomic keyboard input device for use with an electronic system such as a portable telephone. Only slight gestural movements of the thumb are required to actuate the limited number of individual keys on the keyboard.

U.S. Pat. No. 5,500,643 to Grant discloses a one hand prehensile keyboard of the QWERTY type wherein the rows of keys are angled away from the top and bottom parallel axes of the keyboard so as o eliminate ulnar-deviation of the actuating hand.

None of the foregoing prior art patents discloses or suggests the rounded keypad keyboard proposed by applicant that is adaptable for various languages and is unusually flexible nor do they disclose the geometry of the keypad proposed by applicant.

SUMMARY OF INVENTION

This invention relates to a rounded keypad wherein a plurality of control keys are mounted in a circular or other selected configuration to be operated by one or both thumbs. The keys include a first group of high using frequency keys corresponding to letters of the English alphabet positioned in a circular type or rounded arrangement, which is defined by an eye's focal point on the keypad and by a minimum movement radius of the finger of the operator. A second group of low frequency keys is arranged concentrically about the first group. The invention also pertains to the arrangement of the keys per se on a keypad.

The keys may involve an alphabet mode arrangement activated by an English alphabet mode switch (Mode 1) or a symbol/number mode arrangement mode switch (Mode 2). Mode 3 involves a foreign language arrangement activated by a foreign language mode switch.

The rounded keypad also includes functions 1–3 with appropriate function keys generally located in the center of the control keys. The function keys provide directions to the device receiving input from the rounded keypad such as "enter", "delete", "shift", etc.

Accordingly, the present invention represents an effort to solve the problems occurring in the related prior art, and an object of the present invention is to provide a rounded keypad device which is capable of being operated with only one finger, whereby input operations of desired characters, numerals and function executing instructions can be quickly implemented.

Another object of this invention is to provide a miniaturized rounded keypad device which provides quickness and convenience in inputting information at the same level as a keyboard of a computer system while applied to a portable radiotelephone or the like.

Still another object of this invention is to provide a rounded keypad device, which allows a user to easily recognize and remember a key arrangement and is configured to facilitate movement of an operating finger so that key input operations can be performed in a more convenient and quick manner.

A further object of this invention is to provide a new and improved is to provide a new and improved keypad having a unique geometric arrangement of keys.

In order to achieve the above objects, according to one aspect of the invention, there is provided a rounded keypad device capable of being operated with only one finger comprising: a keypad having keys which are positioned within a movement radius of the finger of an operator and correspond to the letters of the English alphabet required for instructions and the number of functions to be executed. A high using-frequency key section comprises a first group of arranged keys among the keys of the keypad, the first keys being assigned to English letters and functions which are relatively frequently used when inputting letters and function executing instructions. The first keys are positioned in a circle type arrangement which is defined by an eye's focal point on the keypad and by a minimum movement radius of the finger of the operator, along a first virtual circle. A low using-frequency second key section comprises the remaining keys among the keys of the keypad, the second keys assigned to English letters and function which are being relatively infrequently used when inputting letters and functions executing instructions. The second keys are positioned outward of the circular area of the high using frequency key section, along a second virtual concentric circle and have a radius larger than the minimum movement radius.

According to another aspect of the invention, the first keys involve a high using frequency key section and substantially comprise vowel keys, which are relatively frequently used when inputting letters.

According to another aspect of the invention, the second keys constitute a low using-frequency key section and substantially comprise the consonant keys which are relatively infrequently used when inputting letters.

According to another aspect of the invention, each of the high and low using frequency key sections defines a virtually elliptical or other rounded arrangement about a central point.

According to another aspect of the present invention, the rounded keypad device further comprises a function key section comprising one or more keys in a third group, said keys being assigned to functions which are relatively frequently used when inputting function executing instructions. The third keys are positioned inward of the round or circular type area of the high using frequency key section, forming a third virtual circle which is concentric with the first and second virtual circles and has a radius smaller than the minimum movement radius.

According to still another aspect of the present invention, the first keys, which constitute the high using-frequency key section, include numerical keys; and the second keys that constitute the low using-frequency key section, comprise alphabetical keys or other keyboard symbols.

According to still another aspect of the present invention, other international language character keys are added to the first group of keys and to the second group of keys.

According to still another aspect of the present invention, the whole set of non-English characters (such as Cyrillic) are mapped to the first and the second group of keys as in some U.S.-international keyboard formats.

According to yet still another aspect of the present invention, each of the high and low using-frequency key sections defines or all other possible rounded arrangements such as a virtual elliptical arrangement.

BRIEF DESCRIPTION OF DRAWINGS

The above objects and other features and advantages of the present invention will become more apparent after a reading of the following detailed description when taken in conjunction with the drawings, in which.

FIG. 8*g* discloses a circular arrangement of keys in alphabetical order and.

DETAILED DESCRIPTION

Figure 1:
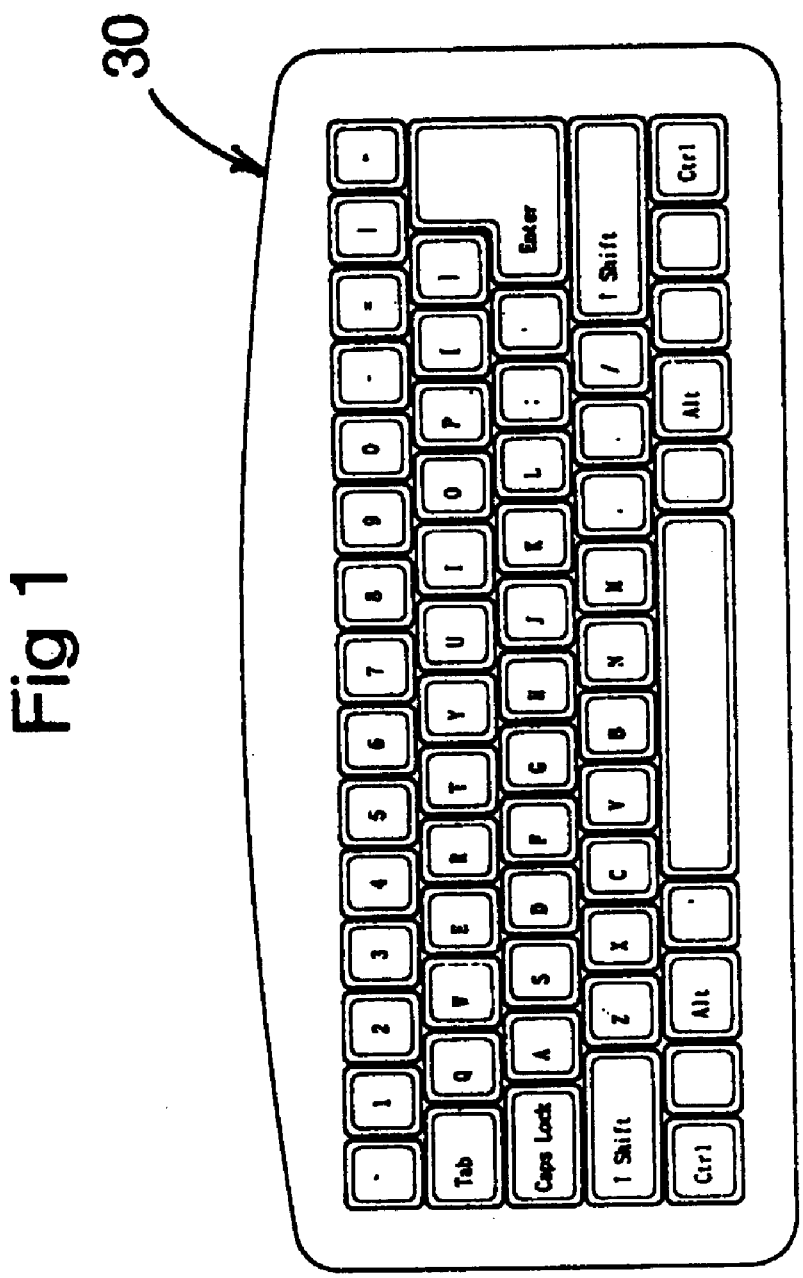
FIG. 1 is a plan view illustrating a prior art key arrangement of a computer keyboard which is employed for input of characters, numerals, symbols and function executing instructions.

Reference will now be made in greater detail to preferred embodiments of the present invention. In the drawings, the same or similar elements are denoted by the same reference numerals even though they are depicted in different drawings. Also, while specific items such as a circuit elements or the like are given in the following description, a person skilled in the art will readily recognize that they are rendered to facilitate understanding of a concept of the present invention and the present invention can be embodied not just by using the specific items. In the following description of the present invention, a detailed explanation of known functions and configurations incorporated herein will be omitted when it may make the subject matter of the present invention rather unclear.

Figure 2:
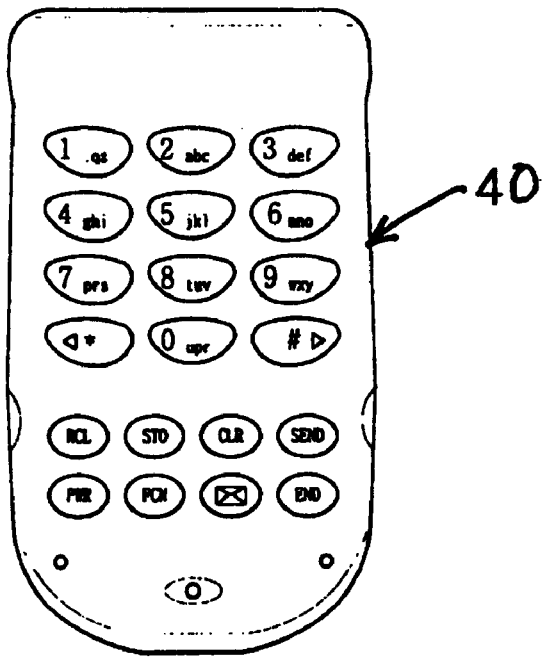
FIG. 2 is a plan view illustrating a prior art key arrangement for a rounded keypad for a portable radiotelephone, which is employed as character input means.
Figure 3:
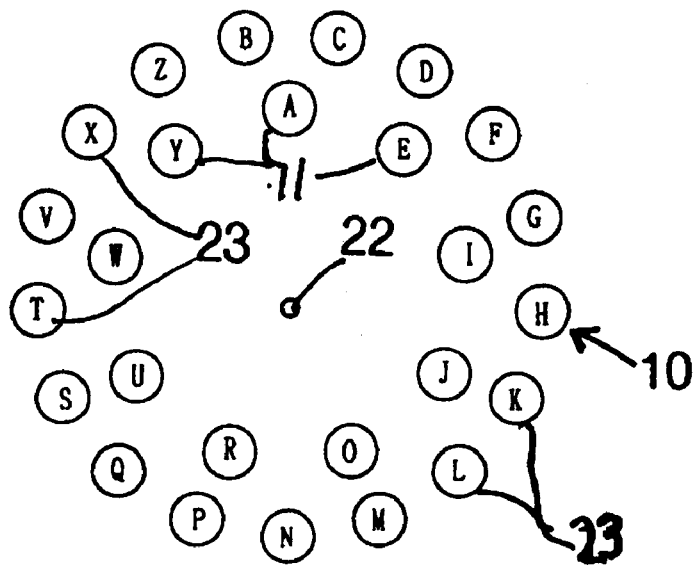
FIG. 3 is a plan view illustrating the key arrangement of a rounded keypad device in accordance with a first embodiment of the present invention.

FIG. 1 represents a prior art keyboard 30 for a computer; FIG. 2 represents a prior art keyboard 40 for a cellular phone or similar instrument; FIG. 3 is a plan view illustrating the key arrangement of a rounded keypad device 10 in accordance with a first embodiment of the present invention.

Referring to FIG. 3, the rounded keypad device 10 according to this first embodiment of the present invention has twenty-six keys 11 which correspond to letters of the English alphabet. The twenty-six keys 11 define a circular arrangement as can be readily seen from FIG. 3. The twenty-six keys 11 which are arranged in the aforesaid circular layout are positioned within a movement radius in which an operator's thumb for pressing keys 11 upon inputting English letters can be moved.

Describing in detail the arrangement of the twenty-six keys 11 which are part of the English alphabet, keys 11 of high using-frequency, that is, are assigned to letters which are frequently used are positioned around an eye's focal point within a minimum circular movement radius in which the operating finger of the operator can be moved. The eye's focal point 22 designates a first recognized center portion of a keypad 10 in the case that the operator views the keypad 10 for input of letters. With this feature, the operator can easily recognize and remember the key arrangement, and at the same time, the key arrangement can effectively satisfy the movement of the operating finger, generally the thumb.

Letters of high using-frequency can comprise vowels A, E, I O, and U, as well as consonants, W, and Y. In addition to these vowels and letters, other keys can be included with the vowels of high using-frequency. For example, even through J and R are consonants, they may also be arranged in such a way as to be included with the keys of high using-frequency.

Other keys of low using-frequency, that is, assigned to letters which are relatively infrequently used when inputting English letters, are arranged in a concentric circle outward of the keys of high using-frequency. That is to say, the keys 23 of low using-frequency are assigned to letters which are relatively infrequently used in comparison with the keys of high using-frequency. Letters of low using-frequency can comprise consonants including B, C, K D, F, G, H, K, L, M, N, P, Q, S, T, V, X, and Z. It is to be readily understood that since the consonants J and R as well as W and Y are already included in the keys 23 of high using-frequency, they are not included in the keys 11 of low using-frequency.

However, the above-described key arrangement merely exemplifies a preferred embodiment of the present invention and must not be understood to restrict the scope of the present invention. Therefore, the present invention can be embodied in a manner such that the key arrangement is varied in conformity with each different situation.

The keys 23 of low using-frequency are also positioned around the eye's focal point on the keypad within the movement radius in which the operating thumb of the operator can be moved to define a circular arrangement. However, as described above, the keys 23 of low using-frequency are arranged outward of the keys 11 of high using-frequency.

The key arrangement which is proposed by the present invention is designed to enable the operator to more quickly press the letters of high using-frequency. In addition, this key arrangement was proposed in consideration of the fact that a moving characteristic of the operating finger or fingers tracks a circular path while implementing key input operations.

Further, it is to be noted that the letters are continuously arranged in their alphabetical order in order to improve key recognizability upon performing key input operations. In other words, the alphabet keys are successively arranged in their alphabetical order along a clockwise or counterclockwise direction.

On the other hand, in the case that the keypad device 10 according to the first embodiment of the present invention is actually applied to a product, when it is required to input special symbols, numerals and functions executing instructions, in addition to the alphabet keys, corresponding keys can be arranged in proper places and the process of arranging the corresponding keys can be accomplished by an adequate key co-assignment.

As a consequence, when arranging the keys 11 on the keypad device 10 according to the first embodiment of the present invention, the keys 11 which are assigned to the vowels and consonants which are relatively frequently used upon inputting English letters, are positioned around the eye's focal point on the keypad within the minimum movement radius in which the operating finger of the operator can be moved, in such a way as to define a circular arrangement. And, the keys 23 which are assigned to the consonants which are relatively infrequently used upon inputting English letters are positioned around the eye's focal point on the keypad 10, within a maximum movement radius in which the operating finger of the operator can be moved and outward of the keys 11 of high using-frequency, in such a way as to define a second circular arrangement.

While not separately shown in the drawing, when it is necessary to input letters belonging to Latin languages, the above described key arrangement can be adopted as is. Further, the individual keys 11 and 23 may be of any size or physical form.

Figure 4:
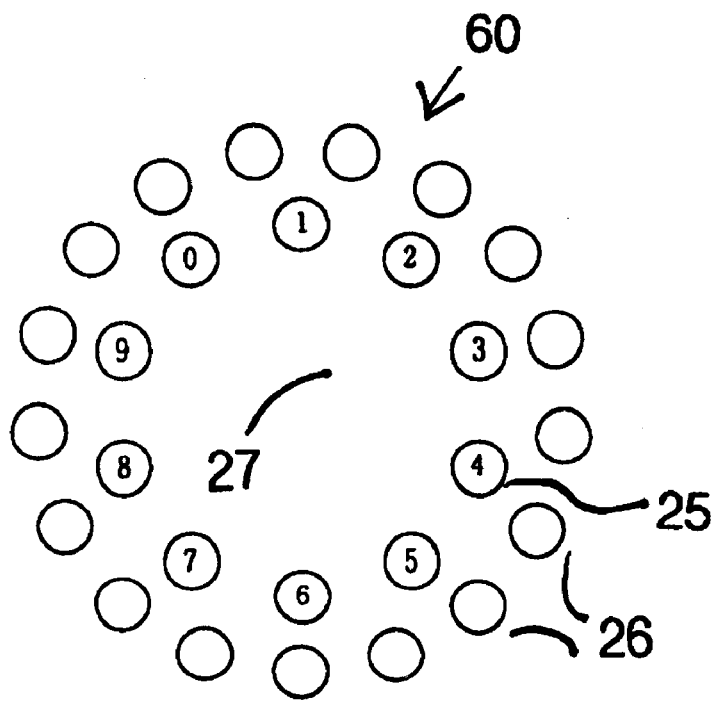
FIG. 4 is a plan view illustrating the key arrangement of a rounded keypad device for input of numerals/other keyboard symbols in accordance with a second embodiment of the present invention.

FIG. 4 is a plan view illustrating a key arrangement of a rounded keypad device 60 for input of numerals/English letters in accordance with a second embodiment of the present invention. This keypad device shown in FIG. 4 can be used in a bank or a financial agency where numerals will be frequently inputted.

The keypad device according to this second embodiment of the present invention has keys 25 the number of which at least corresponds to the sum of the number of English letters and the numerals 0 through 9. The keys define a circular arrangement as can be readily seen from FIG. 4. The keys 25 are positioned within a movement radius in which an operator's finger for pressing keys can be moved.

In this second embodiment of the present invention, keys 25 of high using-frequency are assigned to numerals and thereby serve as numeral keys. In addition, keys 26 of low using-frequency are assigned to English letters and thereby serve as alphabet keys.

The keys 25 of high using-frequency, that is, assigned to the numerals, are positioned around the eye's focal point 27 on a keypad 60 within a minimum movement radius in which the operating finger of the operator can be moved, in such a way as to define a circular arrangement. The keys 26 of low using-frequency assigned to the English letters, are positioned outward of the keys 25 of high using-frequency within the movement radius in which the operating finger of the operator moves.

In the case of the second embodiment of the present invention, depending upon a choice of the operator, the keys 25 of high using frequency which are assigned to the numerals, can also be assigned to vowels of the English alphabet which are relatively frequently used. This change can occur when the keypad device 60 has an input mode conversion function between the alphabet and the numerals.

In another feature of the present invention, it is also possible for the keys 26 of low using-frequency to be assigned to the numerals. In this case, in the key arrangement shown in FIG. 3, the keys 23 of low using-frequency which are assigned to consonants which are relatively infrequently used when inputting English letters, can also be assigned to the numerals. This change can occur when the keypad device 60 has an input mode conversion function between the consonants and the numerals.

Figure 5A:
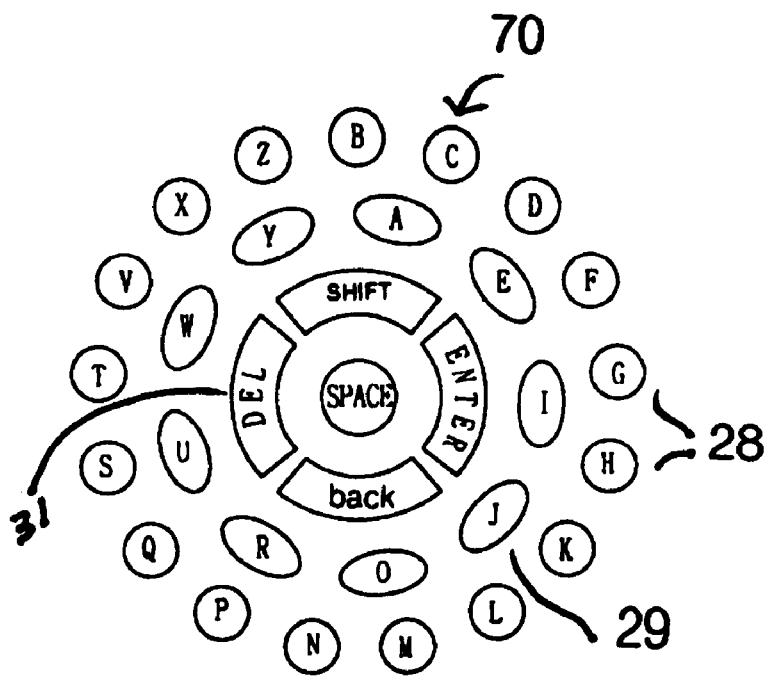
FIGS. 5a–5b are plan views illustrating key arrangements of a rounded keypad device for input of English letters/ functions executing instructions in accordance with a third embodiment of the present invention.
Figure 5B:
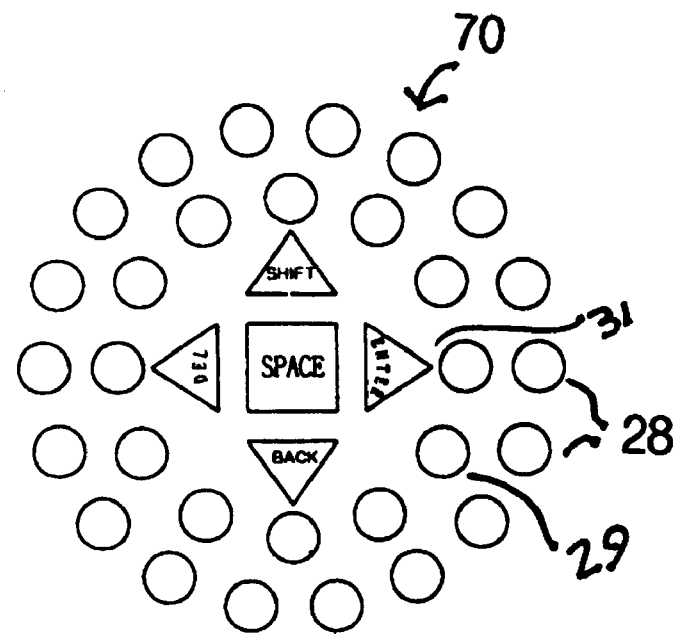

FIGS. 5a–5b are plan views illustrating key arrangements, of a rounded keypad device 70 for input of English letters function executing instructions in accordance with a third embodiment of the present invention. This keypad device shown in FIGS. 5a–5b can be used when function execution is frequently required for example, SHIFT, ENTER, DELETE, BACK and SPACE.

The keypad device according to this third embodiment of the present invention has keys 28 and 29 the number of which corresponds to the sum of the number of English letters and the number of functions to be executed. The keys 28, 29 and function keys 31 define a circular arrangement as can be readily seen from FIGS. 5a–5b. The keys 28, 29 and 31 which are thus arranged are positioned within a movement radius in which an operator's finger for pressing keys can be moved.

In this third embodiment of the present invention, keys 29 of high using-frequency are assigned to functions and thereby serve as function keys. In addition, keys 28 of low using-frequency are assigned to. English letters and thereby serve as alphabet keys.

The keys 31 of high using-frequency, that are assigned to functions, are positioned in a circular arrangement around an eye's focal point on a keypad 70 within a minimum movement radius in which the operating thumb of the operator can be moved. The keys 28 of low using-frequency assigned to particular English letters are positioned outward of the keys 29 of high using frequency within the movement radius in which the operating finger of the operator can be moved.

On the other hand, it is to be readily understood that the key arrangements shown in FIGS. 5a–5b are defined by adding function keys 31 to the key arrangement according to the first embodiment of the present invention.

Namely, the key arrangement which is proposed by this embodiment of the present invention is to configure a keypad device 70 which is most suitable for letter input and function execution, and is defined by adding the function keys to the key arrangement shown in FIG. 3, including the keys of high using-frequency and low using-frequency.

The functions to which the keys 29 of high using-frequency are assigned, can include ENTER, SPACE, DELETE, a direction changing function, MODE, LOCK, etc. which are relatively frequently used. The function keys shown in FIG. 5a are respectively assigned to ENTER, SPACE, DELETE, MODE and LOCK, and the function keys shown in FIG. 5b are further assigned to the direct changing function in addition to the functions given in FIG. 5a. In the meanwhile, the function keys 29 are positioned in place inward of the round type area of the high using frequency keys, about a virtual circle which has a radius smaller than the minimum movement radius of the high using frequency keys.

When it is required to input special symbols, etc., in addition to the function keys and the alphabet keys, such keys can be arranged using the same principle as mentioned above, depending upon its using frequency. In this case, the keypad device 70 according to this embodiment of the present invention is similar to the key arrangement having numerals keys.

Figure 6A:
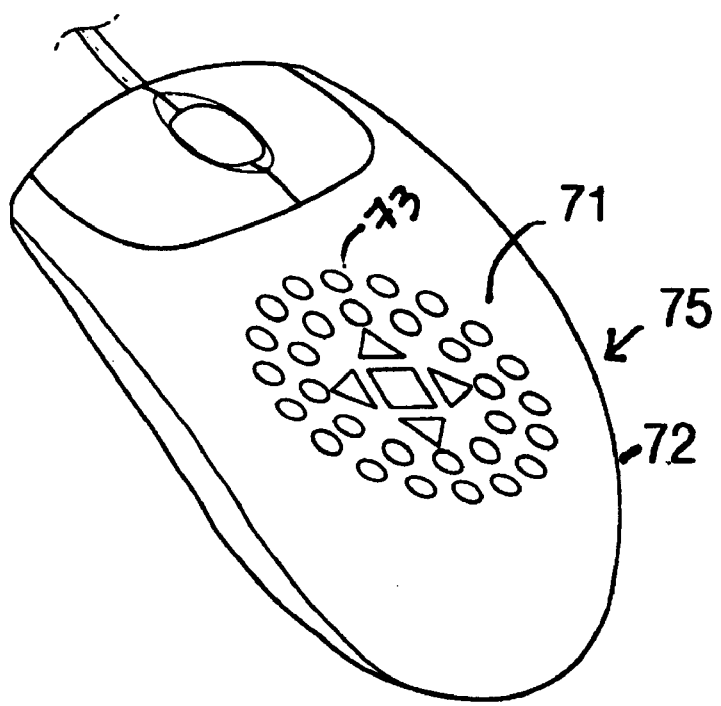
FIGS. 6a–6b are perspective views illustrating different embodiments wherein the rounded keypad device according to the present invention actually serves as a key input device.
Figure 6B:
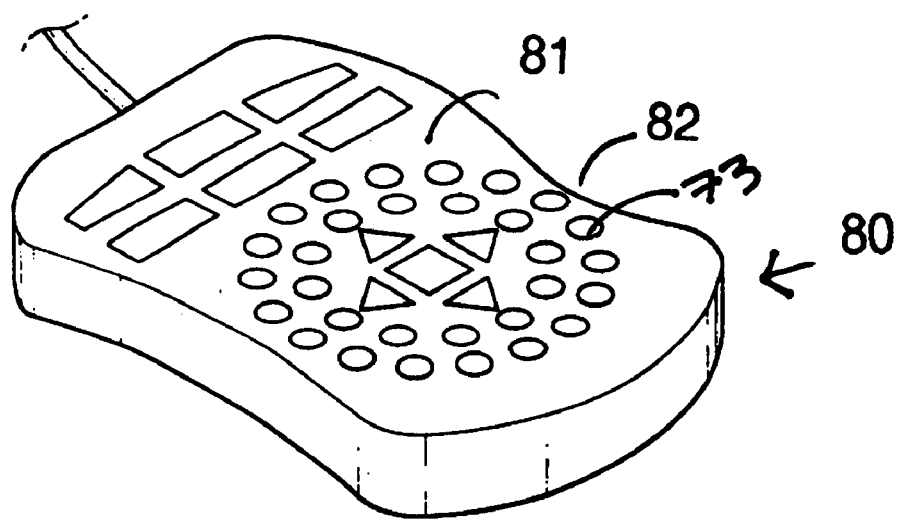

FIGS. 6a and 6b are perspective views illustrating embodiments wherein the rounded keypad devices 75 and 80 according to the present invention actually serve as a key input device.

The keypad device according to the present invention is embodied in a case 72, 82 which can be used by the operator while being grasped by the hand, and the keys 73 which constitute each of the keypad devices 75 and 80 according to the above-described embodiments, are arranged on a surface 71, 81, of the case. The keys 73, which are arranged in this way, are respectively fitted into key grooves that are defined on the upper surface of the case 72 and 82.

The key layout on case 72 and 82 generally has a rounded configuration. Of course, it is to be noted that the case 72 and 82 and key layout can be formed to have a variety of configurations such as an elliptical contour, etc. as occasion demands. The case 72 and 82 can delimit an upper part of a conventionally used computer mouse or can serve as a keypad of a portable radiotelephone.

The rounded keypad device 70, 80 according to the present invention provides advantages in that, since the rounded keypad device or thumb pad is capable of being operated with only one finger for an operator input of desired characters, numerals and function executing instructions can be more quickly implemented.

Also, the rounded keypad device provides quickness and convenience while inputting information, of the same level as those of a computer keyboard and also provide the same accuracy in a reduced size format such as portable radiotelephones or the like.

Figure 7A:
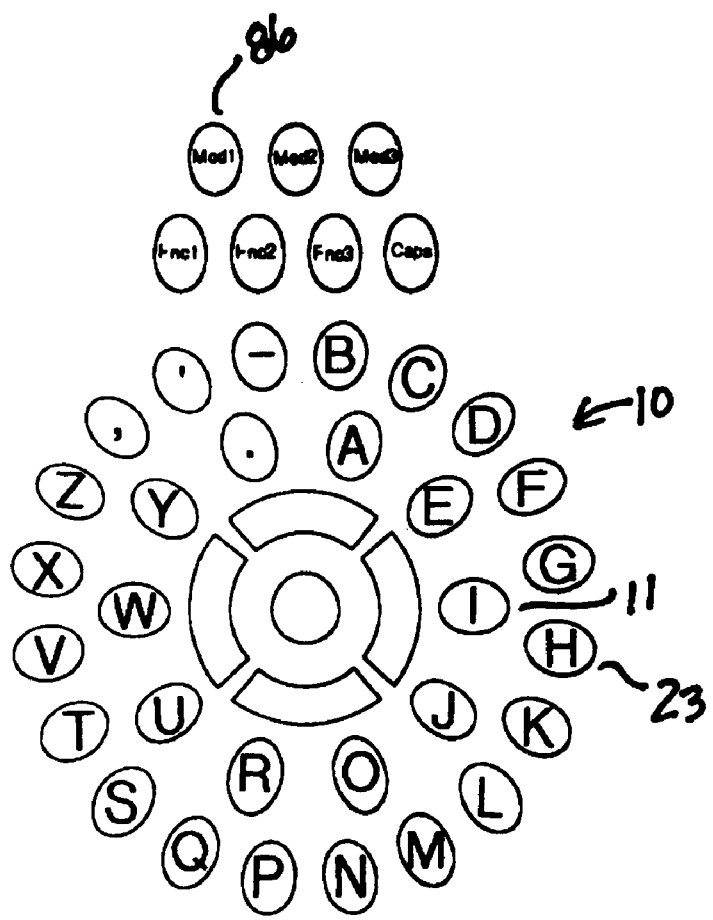
FIG. 7a discloses an alphabet mode arrangement actuated by an English alphabet (Mode 1) switch.
Figure 7B:
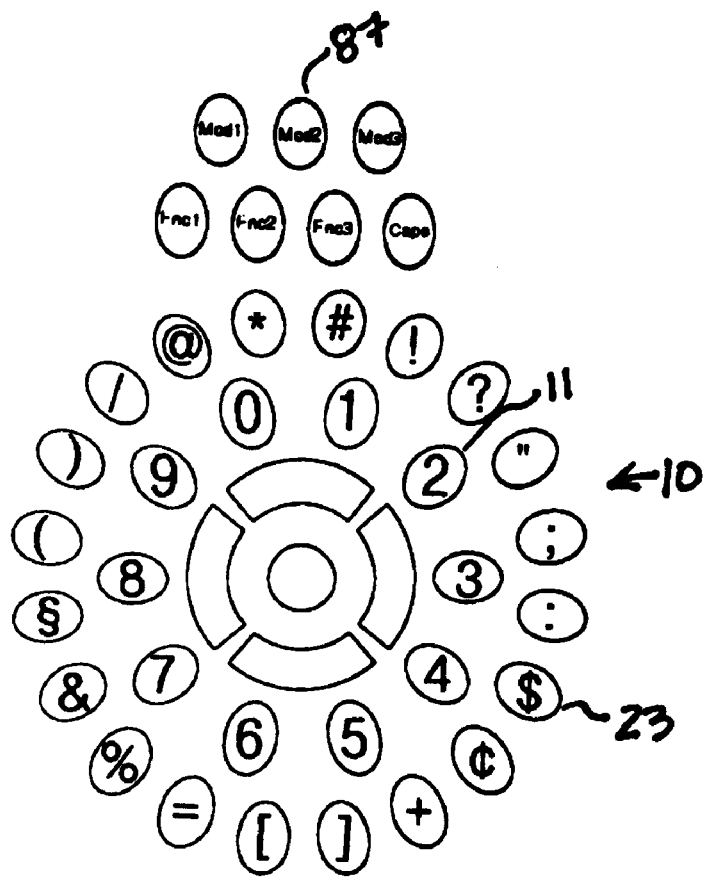
FIG. 7b discloses a symbol/number mode arrangement activated by a symbol/number switch (Mode 2).
Figure 7C:
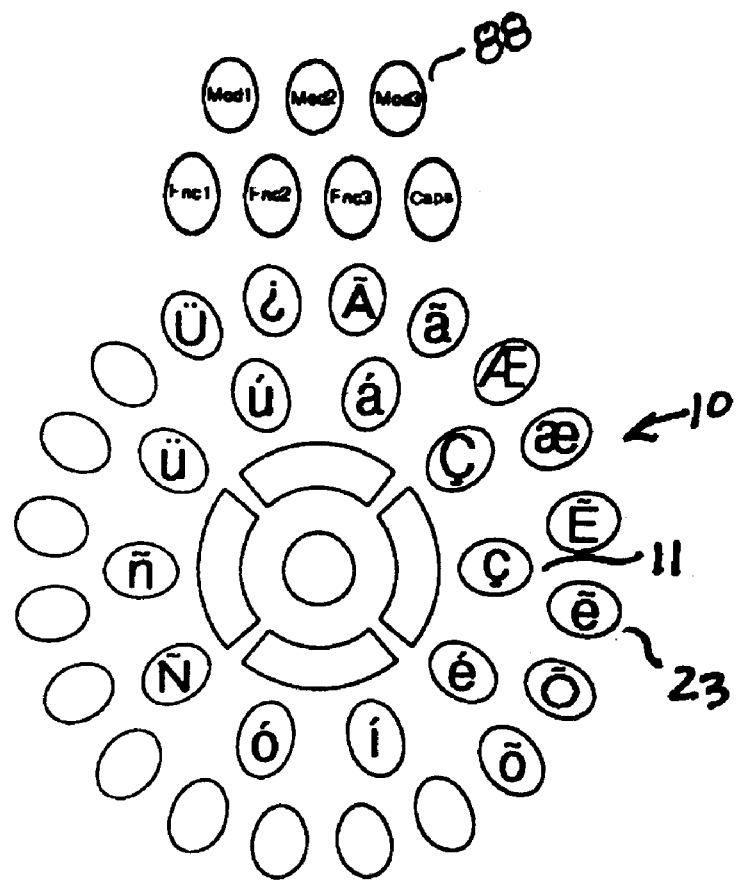
FIG. 7c discloses a symbol/number mode arrangement activated by a symbol/number switch (Mode 3).

Referring now to FIG. 7a of the drawings, the invention relates to a rounded keypad 10 having a plurality of buttons, keys, or the like 11 and 23 to input information into various systems. The concentric array of keys 11 and 23 on the rounded keypad 10 provides the fastest and easiest method of inputting of information compared to the conventional keyboard. FIG. 7a discloses an alphabet made arrangement actuated by an English alphabet (Mode 1) switch 86. FIG. 7b discloses a symbol/number mode arrangement activated by switch 87 (Mode 2). FIG. 7c discloses a foreign letter arrangement activated by switch 88 (Mode 3) which can comprise any selected language.

Figure 7D:
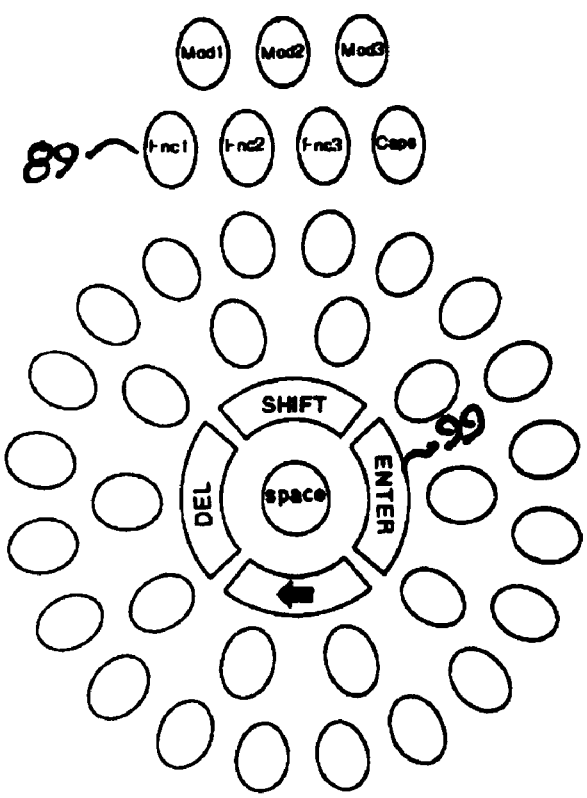
FIG. 7d discloses a pointer mode version of the invention activated by a pointer switch.

FIG. 7d discloses a function arrangement for the function designated "Function 1". The function keys 89 and the Function 1 switch 99 may be colored, for example red, for ease of recognition.

Figure 7E:
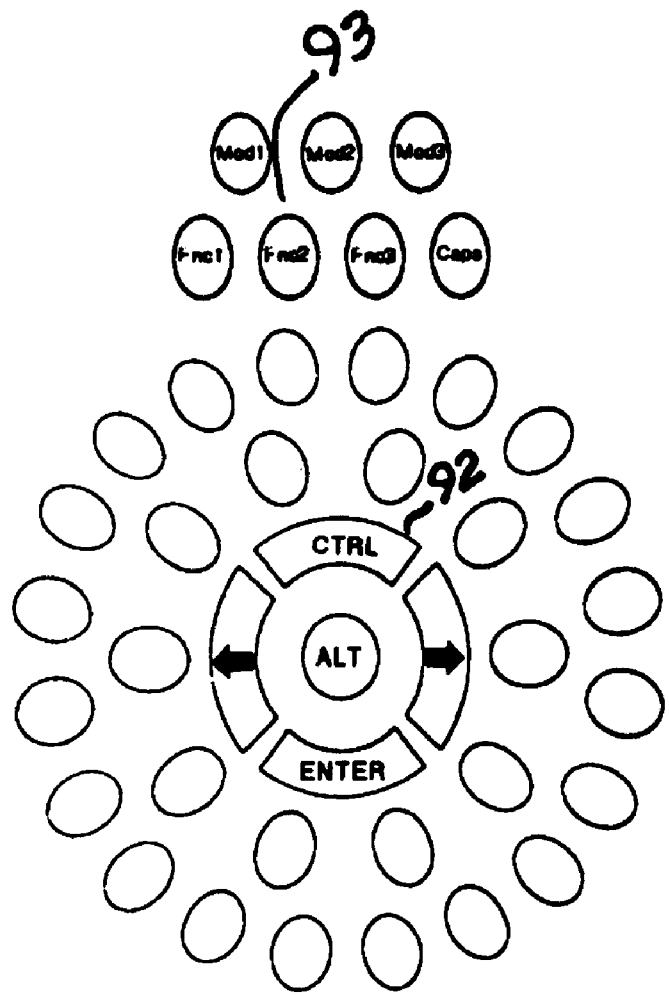
FIG. 7e discloses a page turning mode embodiment activated by a page switch.

FIG. 7e discloses a function arrangement for the function designated "Function 2". The function keys 92 are operated by function key 93.

Figure 7F:
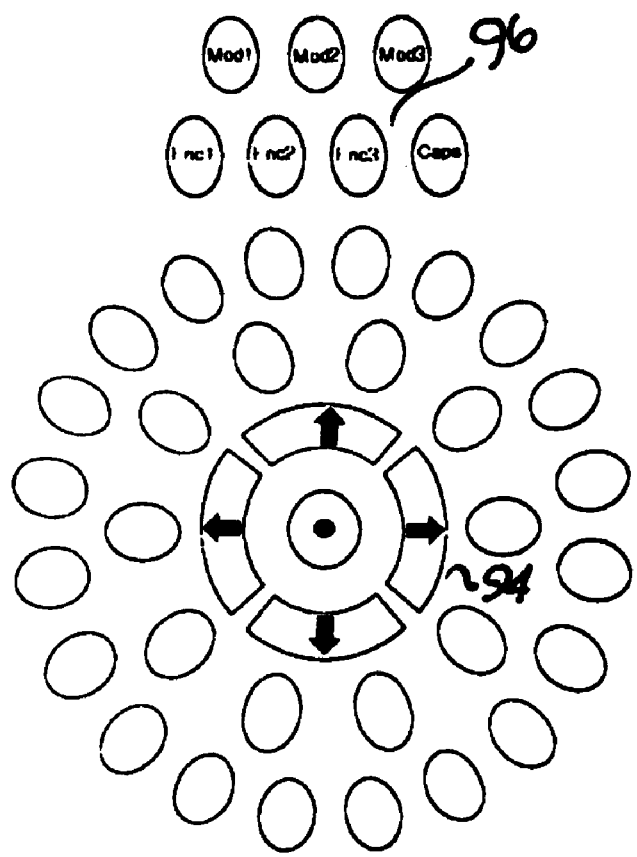
FIG. 7f discloses phone mode embodiment activated by a phone switch.

FIG. 7f discloses a function arrangement for the function designated "Function 3". The function keys 94 are operated by function key 96.

Figure 7G:
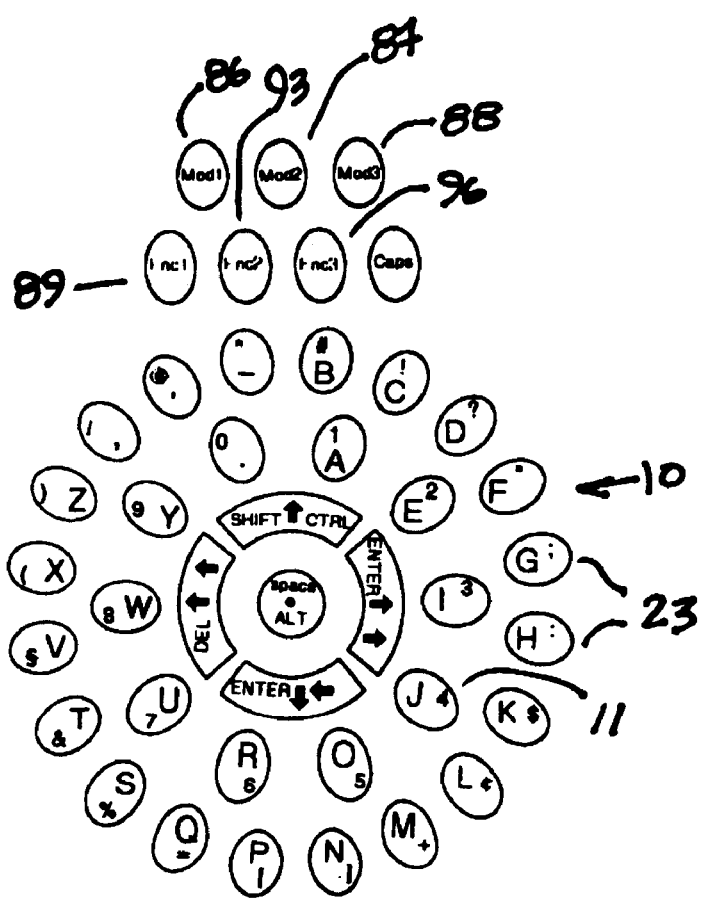
FIG. 7g discloses right and left click buttons in the environment of the present invention.

FIG. 7g discloses an English alphabet arrangement of keys including subsidiary number and symbol keys and mode keys for control purposes various colors may be used to designate particular keys.

Figure 8A:
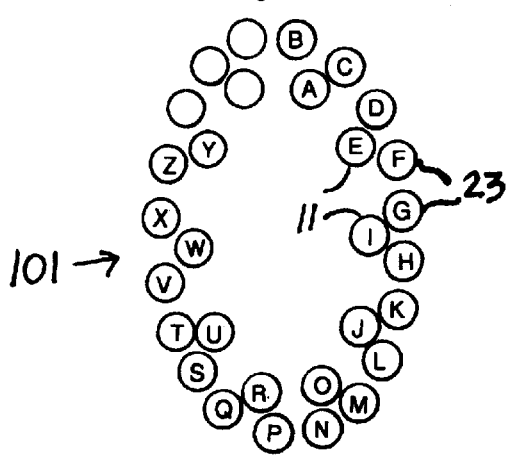
FIG. 8a discloses an elliptical arrangement of keys.
Figure 8B:
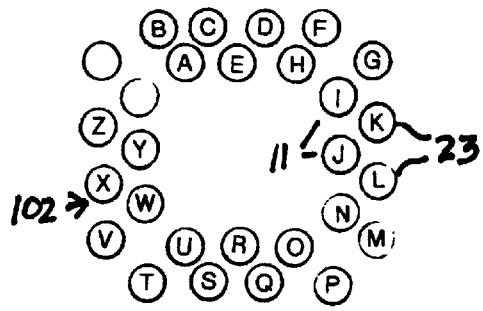
FIG. 8b discloses a square arrangement of keys.
Figure 8C:
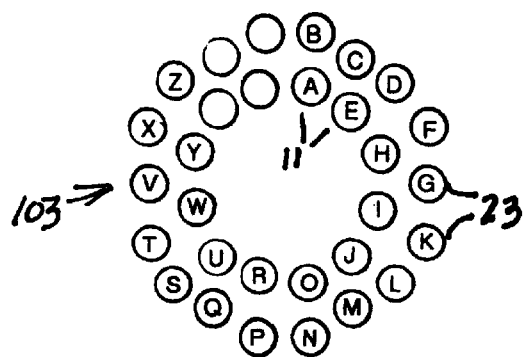
FIG. 8c discloses a hexagonal arrangement of keys.
Figure 8D:
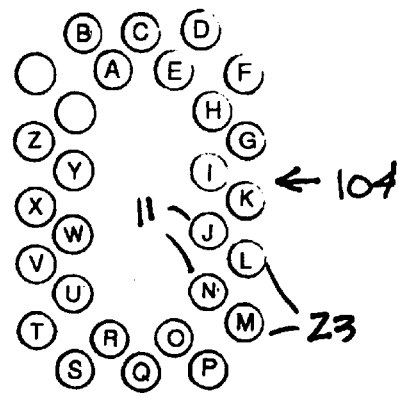
FIG. 8d discloses an rectangular arrangement of keys.
Figure 8E:
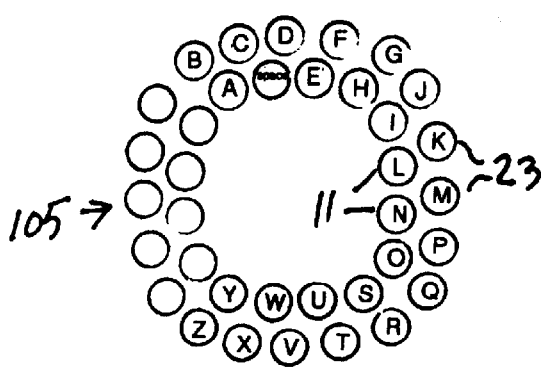
FIG. 8e discloses a rounded corner arrangement of keys with 9 optional keys.
Figure 8F:
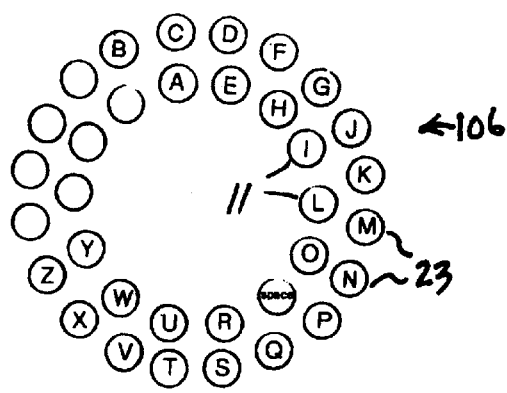
FIG. 8*f* discloses a circular arrangement of keys with 7 optional keys.
Figure 8G:
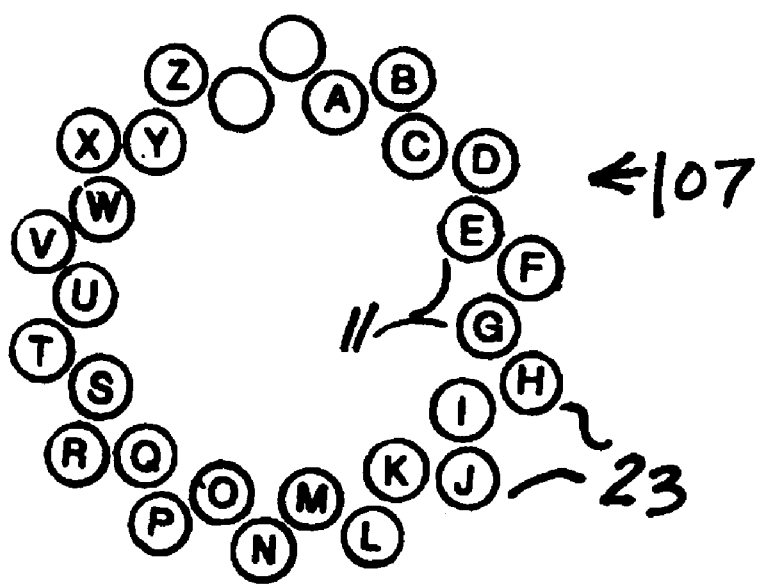
Figure 8H:
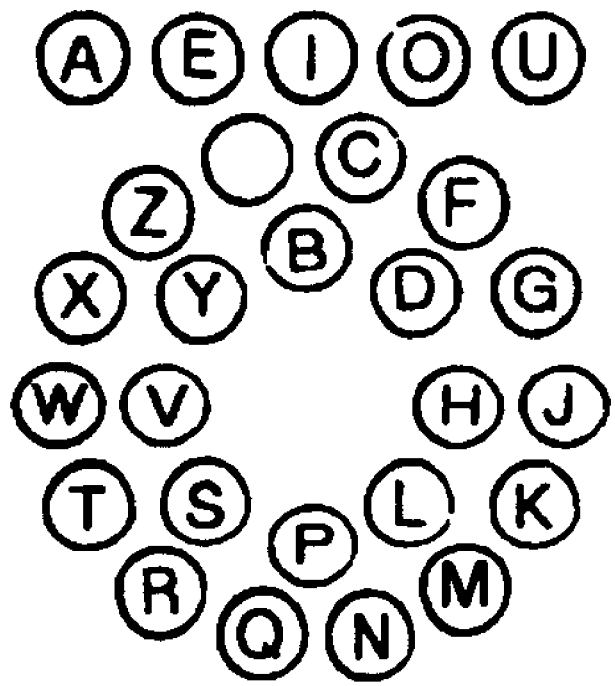
FIG. 8*h* discloses an arrangement of consonant keys in alphabetical order and an adjacent array of vowel keys.

FIG. 8a–f discloses various geometrical arrangements of keys 11 and 23 in an elliptical configuration 101 (FIG. 8a), a square configuration 102 (FIG. 8b), a hexagonal arrangement 103 (FIG. 8c), a rectangular arrangement 104 (FIG. 8d), an rounded corner arrangement 105 (FIG. 8e) and a circular arrangement 106 (FIG. 8f). FIG. 8g depicts a circular arrangement of keys 11 and 23 in a circular design 107 in alphabetic order in contrast to the high user and lower user orders. FIG. 8h discloses an arrangement of consonant keys in alphabetical order and adjacent vowel keys.

The rounded keypad may be also presented in various configurations about a control center such as ellipses, ovals, squares, rounded, circles, etc. The rounded keypad may be used with any number of keys, which may be arranged clockwise or counter-clockwise. In the various key arrangements, applicant has not shown the particular device on which the keypad 10 is mounted or to which it is connected such is within the skill of the art. The keypad configurations shown in FIGS. 8a–8h are an important aspect of the invention and can be used with any type keypad device.

While the invention has been explained by a detailed description of certain specific embodiments, it is understood that various modifications and substitutions can be made in any of them within the scope of the appended claims, which are intended also to include equivalents of such embodiments.

What is claimed is:

1. A keypad for inputting data to a device capable of being operated with only one finger comprising:

a plurality of keys positioned within a movement radius of a finger of an operator and corresponding at least to the sum of the number of English letters required for inputting desired words and the instructions of functions to be executed;

a high using-frequency key section comprising a first set of keys among the keys of the keypad, the first set of keys being assigned to English letters and functions which are relatively frequently used when inputting letters and functions executing instructions, the first set of keys being positioned in a round type configuration which is defined around an eye's focal point on the keypad and a minimum movement radius of the finger of the operator, along a first virtual circle, the keys of the first set being arranged sequentially to follow an alphabetical arrangement thereabout; and a low using-frequency key section comprising a second set of keys among the keys of the keypad, the second set of keys being assigned to English letters and functions which are relatively infrequently used when inputting letters and at functions executing instructions, the second set of keys being positioned outward of the round type configuration of the high using-frequency key section, around a second virtual circle which is concentric with the first virtual circle and has a radius larger than the minimum movement radius of the operator's finger the keys of the second set being arranged sequentially to follow an alphabetical arrangement thereabout.

2. A keypad for inputting data to a device capable of being operated with only one finger in accordance with claim 1 wherein;

the first set of keys that comprise the high using-frequency key section, are substantially vowel keys that are relatively frequently used when inputting letters.

3. A keypad for inputting data to a device capable of being operated with only one finger in accordance with claim 1 wherein:

the second set of keys that constitute the low using-frequency key section, comprise consonant keys that are relatively infrequently used when inputting letter.

4. A keypad for inputting data to a device capable of being operated with only one finger in accordance with claim 1 further including:

a function key section constituted by at least one third key;

the at least one function key being positioned anywhere within a movement radius of the finger of an operator;

the at least one third key being assigned to functions which are relatively frequently used when inputting function executing instructions.

5. A keypad for inputting data to a device capable of being operated with only one finger in accordance with claim 1 further including:

a plurality of function keys positioned on the keypad device anywhere within a movement radius of the operating finger.

6. A keypad for inputting data to a device capable of being operated with only one finger in accordance with claim 1 further including:

a function key section comprising at least one function key, the at least one function key being assigned to functions which are relatively frequently used when inputting function executing instructions; and the at least one function key being positioned inward of the round type area of the high using frequency key section, in a third virtual circle which is concentric with the first and second virtual circles and has a radius smaller than the minimum movement radius.

7. A keypad for inputting data to a device capable of being operated with only one finger in accordance with claim 1 wherein:

the first set of keys and the second set of keys permit mapping of any international alphabets or symbols.

8. A keypad for inputting data to a device capable of being operated with only one finger in accordance with claim 1 wherein:

each of the high and low using-frequency key sections define any possible virtually rounded arrangement.

9. A keypad for inputting data to a device capable of being operated with only one finger in accordance with claim 1 wherein:

the first and second Bets of keys comprise any size or physical form.

10. A keypad for inputting data to a device capable of being operated with only one finger in accordance with claim 1 wherein:

the first set of keys and the second set of keys are positioned in an alpha/numerical clockwise arrangement with the second set of keys being positioned concentrically and at a predetermined distance from the first set of keys.

11. A keypad for inputting data to a device capable of being operated with only one finger in accordance with claim 1 wherein:

the keys of the first set and the keys of the second set alternate letter-wise in respective concentric circles.

12. A keypad for inputting data to a device capable of being operated with only one finger in accordance with claim 1 wherein:

the keypad device is operated with one thumb.

13. A keypad for inputting data to a device capable of being operated with only one finger in accordance with claim 1 wherein:

the keypad device is operated with both thumbs to facilitate speed of operation.

14. A keypad for inputting data to a device capable of being operated with only one finger in accordance with claim 1 wherein:

the first set of keys and the second set of keys are positioned in an alpha/numerical clockwise arrangement with respect to each other with the second set of keys being positioned concentrically and at a predetermined distance from the first set of keys, said keys being substantially in alpha/numerical order in the first and second set of keys.

15. A keypad for inputting data to a device capable of being operated with only one finger in accordance with claim 1 wherein:

the keys of the first and second set alternate and continue clockwise as close to alphabetical order as possible in respective concentric circles.

16. A keypad in accordance with claim 1 wherein:

the keys of the first and second sets of keys are arranged relative to each other such that alphabetic letters of the first and second sets of keys together generally sequentially follow an alphabetical arrangement thereabout.

17. A keypad comprising:

a first set of keys comprising a plurality of individual keys having a center coinciding with the eye's focal point and having a predetermined rounded configuration, said keys being arranged in a predetermined order within the rounded configuration, the first set of keys including alphabetic keys arranged sequentially to follow an alphabetical arrangement thereabout; and, a second set of keys comprising a plurality of individual keys surrounding externally and concentrically the rounded configuration of the first set of keys being arranged in a predetermined order, the first set of keys including alphabetic keys arranged sequentially to follow an alphabetical arrangement thereabout.

18. A keypad in accordance with claim 17 wherein:

the first and second set of keys each comprise a predetermined arrangement of keys positioned alphabetically in a clockwise pattern.

19. A keypad in accordance with claim 17 further including:

a set of keys for selectively inputting different case characters and functions.

20. A keypad in accordance with claim 17 wherein:

a third set of keys for selectively inputting different case characters and functions is positioned internally within the rounded first set of keys and near the eye's focal point.

21. A keypad in accordance with claim 17 further including:

a plurality of keys for executing predetermined functions, said keys being positioned within the rounded configuration of the first and second set of keys in a specific portion thereof.

22. A keypad in accordance with claim 17 further including:

a plurality of keys for inputting predetermined symbol characters, said keys being positioned within the rounded configuration of the first and second set of keys in a specific portion thereof.

23. A keypad in accordance with claim 17 further including:

a space key mounted on the keypad within the first set of keys.

24. A keypad in accordance with claim 17 wherein:

the first set of keys comprise keys less frequently used in input and the second set of keys comprise keys used substantially more frequently in input.

25. A keypad in accordance with claim 17 wherein:

the keys of the first and second sets of keys are arranged relative to each other such that alphabetic letters of the first and second sets of keys together generally sequentially follow an alphabetical arrangement thereabout.

26. A keypad in accordance with claim 17 wherein:

the first set of keys comprises keys substantially frequently used in input and the second set of keys comprises keys being less frequently used in input.

27. A keypad in accordance with claim 26 further including:

an arrangement of keys mounted on said keypad for executing predetermined functions.

28. A keypad in accordance with claim 26 wherein:

either the first set of keys or the second sets of keys comprise keys for inputting numeric characters.

29. A keypad in accordance with claim 26 wherein:

the first and second set of keys comprise keys for inputting predetermined international language characters.

30. A keypad in accordance with claim 29 wherein:

the first set of keys comprise substantially vowel characters and the second set of keys comprise only consonants.

31. A keypad in accordance with claim 22 wherein:

the first set of keys comprise only consonant characters and the second set of keys comprise substantially vowel characters.

32. A keypad in accordance with claim 29 wherein:

both the first and the second set of keys comprise consonant characters arranged in an alphabetically clockwise pattern, and vowel characters arranged in a different predetermined pattern adjacent to the clockwise pattern.

33. A keypad in accordance with claim 32 wherein:

the vowel characters are positioned in a straight line adjacent the rounded configuration of the second set of keys.

34. A keypad for inputting data to a device capable of being operated with only one finger comprising:

a plurality of keys positioned within a movement radius of a finger of an operator and corresponding at least to the sum of the number of English letters required for inputting desired words and instructions of functions to be executed;

a high using-frequency key section comprising a first set of keys among the keys of the keypad, the first set of keys being assigned to English letters and numbers which are relatively frequently used when inputting letters and functions executing instructions the first set of keys being positioned in a round type configuration a which is defined around an eye's focal point on the keypad and a minimum movement radius of the finger of the operator, along a first virtual circle, the first set of keys which constitute the high using-frequency key section, comprise numerical keys arranged to follow a equential numerical arrangement thereabout; and a low usincr-freauency key section comprising a second set of keys among the keys to the keypad, the second set of keys being assigned to English letters and functions which are relatively infrequently used when inputting letters and functions executing instructions, the second set of keys being positioned outward of the round type configuration of the high using-frequency key section, around a second virtual circle which is concentric with the first virtual circle and has a radius larger than the minimum movement radius of the operator's finger the second set of keys that constitute the low using-frequency key section, comprise other keyboard symbol keys or signs.

* * * * *

UNITED STATES PATENT AND TRADEMARK OFFICE
CERTIFICATE OF CORRECTION

PATENT NO. : 6,657,560 B1
DATED : December 2, 2003
INVENTOR(S) : Richard Jung

It is certified that error appears in the above-identified patent and that said Letters Patent is hereby corrected as shown below:

Column 9,
Line 50, delete "and functions";
Line 52, delete "and functions executing instructions";
Line 57, delete "sequentially to follow";
Line 58, delete "arrangement" and insert -- order --;
Line 58, delete ";" and insert -- , such that each succeeding key in the first set of keys, starting from a first key, thereof, has a letter of higher order than a letter of a preceding key --;
Lines 61-62, delete "and functions";
Line 63, delete "at functions executing instructions";

Column 10,
Line 4, after "arranged" insert -- in --;
Line 4, delete "sequentially to follow";
Line 4, after "alphabetical" insert -- order --.
Line 5, after "thereabout" insert -- , such that each succeeding key in the second set of keys, starting from a first key, thereof, has a letter of higher order than a letter of a preceding key --;
Line 59, change "Bets" to -- sets --.

Column 11,
Line 45, after "arranged" insert -- in --;
Lines 45-46, delete "sequentially to follow;
Line 46, delete "arrangement";
Line 46, after "thereabout" insert -- such that each succeeding key in the first set of keys, starting from a first key, thereof, has a letter of higher order than a letter of a preceding key --;
Line 49, delete "first";
Line 51, after "arranged" insert -- in --;
Lines 51-52, delete "sequentially to follow";
Line 52, delete "arrangement";
Line 52, after "alphabetical" insert -- order --;
Line 52, after "thereabout" insert -- such that each succeeding key in the first set of keys, starting from a first key, thereof, has a letter of higher order than a letter of a preceding key --;

UNITED STATES PATENT AND TRADEMARK OFFICE
CERTIFICATE OF CORRECTION

PATENT NO. : 6,657,560 B1
DATED : December 2, 2003
INVENTOR(S) : Richard Jung

It is certified that error appears in the above-identified patent and that said Letters Patent is hereby corrected as shown below:

Column 13,
Line 11, change "usincr-freauency" to -- using-frequency --

Signed and Sealed this

Twenty-third Day of March, 2004

JON W. DUDAS
*Acting Director of the United States Patent and Trademark Office*